United States Patent [19]

Niederer et al.

[11] 4,226,715
[45] Oct. 7, 1980

[54] APPARATUS AND METHOD FOR SEPARATING ENTRAINED PARTICULATE MATTER FROM A CONVEYING FLUID

[75] Inventors: Kurt W. Niederer; Robert E. Terrell, both of Charlotte, N.C.

[73] Assignee: The Terrell Machine Company, Charlotte, N.C.

[21] Appl. No.: 78,224

[22] Filed: Sep. 24, 1979

[51] Int. Cl.³ .................. B01D 33/04; B01D 33/06; B01D 46/26
[52] U.S. Cl. .................. 210/783; 55/21;
  55/96; 55/97; 55/213; 55/272; 55/283; 55/290;
  55/350; 55/352; 55/418; 55/422; 55/438;
  55/471; 55/482; 210/777; 210/107; 210/137;
  210/392; 210/396; 210/402
[58] Field of Search .................. 55/21, 96–97,
  55/210, 218, 272, 283, 290, 213, 350–352, 422,
  471, 482, 418, 438; 210/77, 79, 392, 396–397,
  402, 404, 107, 137

[56] References Cited

U.S. PATENT DOCUMENTS

| 969,074 | 8/1910 | Morse | 55/290 |
|---|---|---|---|
| 2,023,036 | 12/1935 | Taylor | 19/156 |
| 2,741,369 | 4/1956 | Fest | 210/402 X |
| 2,868,382 | 1/1959 | Best | 210/295 |
| 3,183,647 | 5/1965 | Lang | 55/96 |
| 3,212,239 | 10/1965 | Maestrelli | 55/290 |
| 3,233,736 | 2/1966 | Vernay | 210/404 |
| 3,327,457 | 6/1967 | Linsl | 55/290 |
| 3,343,342 | 9/1967 | Du Rocher | 55/299 |
| 3,421,291 | 1/1969 | Messen-Jaschin | 55/114 |
| 3,525,198 | 8/1970 | Neitzel | 55/272 |
| 3,572,011 | 3/1971 | Wilhelmsson | 55/290 |
| 3,628,313 | 12/1971 | Broadbent | 55/283 |
| 3,675,393 | 7/1972 | Meade | 55/97 X |
| 3,708,210 | 1/1973 | Stahel et al. | 55/97 X |
| 3,789,587 | 2/1974 | Moorefield | 55/290 |
| 4,045,194 | 8/1977 | Ferri | 55/290 |
| 4,090,857 | 5/1978 | Ferri et al. | 55/337 |

FOREIGN PATENT DOCUMENTS 1061691   7/1959   Fed. Rep. of Germany ............ 55/350

Primary Examiner—Kathleen J. Prunner
Attorney, Agent, or Firm—W. Thad Adams, III

[57] ABSTRACT

An apparatus and method for separating entrained particulate matter from a fluid wherein particulate matter is collected in an overlying porous layer on an upstream side of a rotatable, fluid-permeable filter in a first chamber, and rotatably conveyed into a second chamber and used as an additional filtering medium. The filter comprises a cylindrical drum having a filter surface thereon and is rotatably mounted in an enclosed housing having a fluid inlet and a fluid outlet. Fluid pumping means operatively communicate with the housing for inducing a flow of fluid into the housing through the inlet and out of the housing through the outlet. Chamber means are disposed within the housing and sealingly cooperate therewith and with the cylindrical drum and define a first chamber fluidly communicating with the inlet and a predetermined portion of the cylindrical drum on the upstream and downstream sides thereof. A second chamber is provided which fluidly communicates with the outlet and a second predetermined portion of the cylindrical drum on the upstream and downstream sides thereof. Drive means rotate the cylindrical drum at a predetermined rate through the first chamber for collecting on the filter surface an overlying porous layer of particulate matter, and through the second chamber for filtering fluid through the filter surface and the overlying porous layer of particulate matter. Doffing means are provided for cleaning the filter surface by removing the porous layer of particulate matter therefrom subsequent to the passage thereof through the second chamber.

29 Claims, 11 Drawing Figures

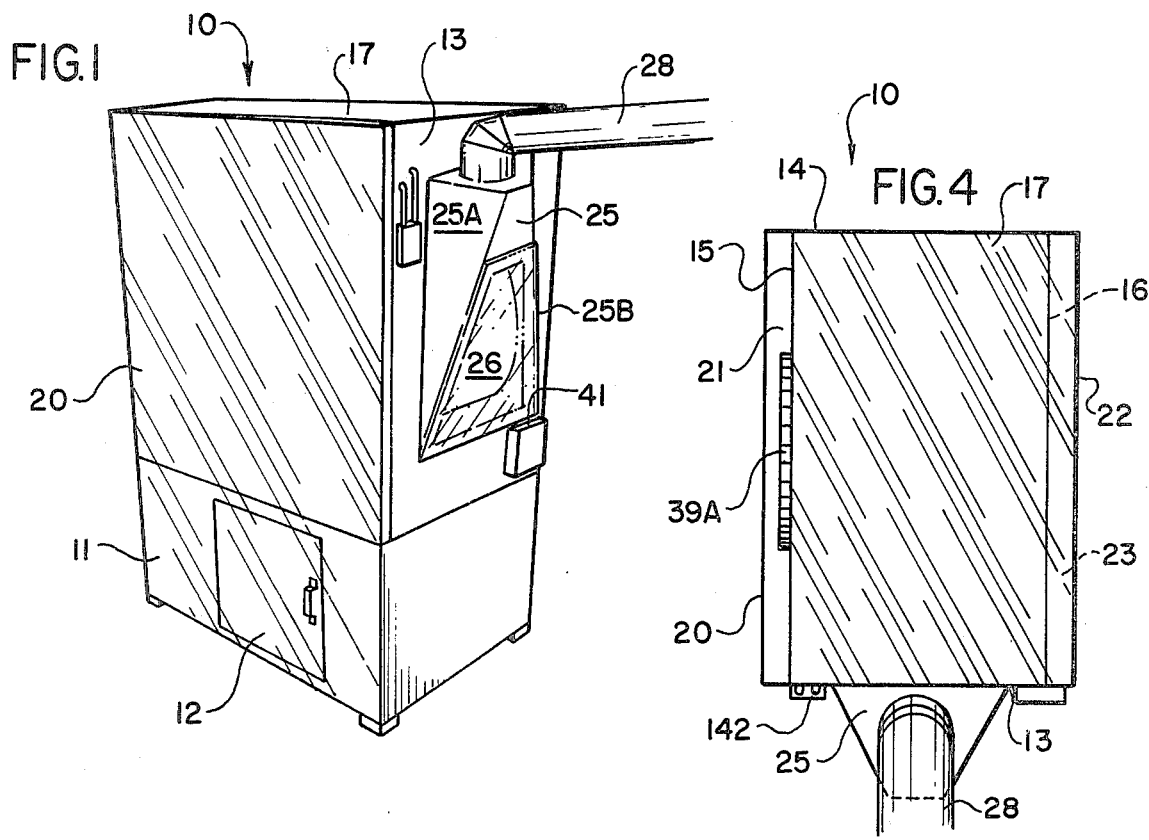
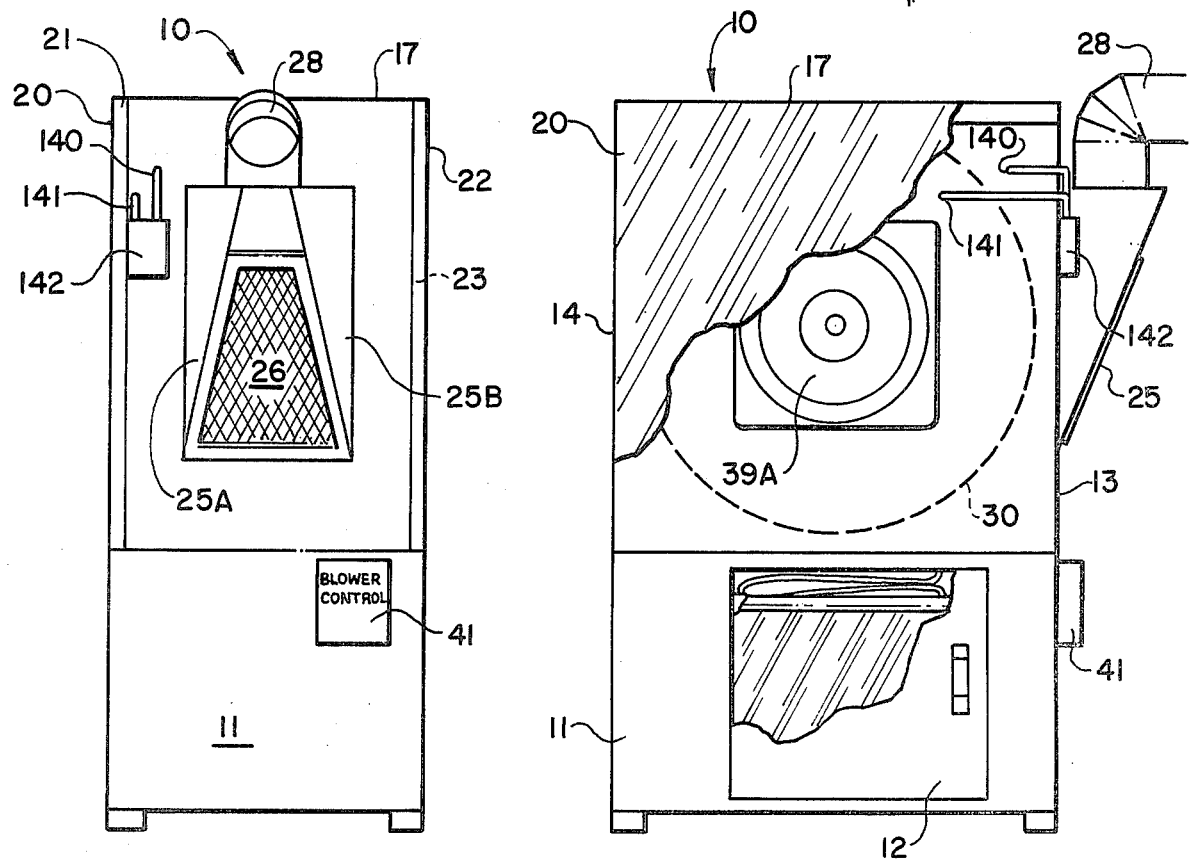
FIG. 1
FIG. 4
FIG. 2
FIG. 3

APPARATUS AND METHOD FOR SEPARATING ENTRAINED PARTICULATE MATTER FROM A CONVEYING FLUID

BACKGROUND OF THE INVENTION

This invention relates to an apparatus and method for separating entrained particulate matter from a conveying fluid. The specific disclosure of this application is that of a filter for removing cotton dust and fiber from air. However, the invention as claimed is not limited to the filtration of any particular type of particulate matter, nor is the invention limited to the filtration of air—the filtration of other fluids, such as other gasses or liquids being contained within the scope of this invention.

The filtration of fluids, especially air, has become an increasingly important aspect of Government regulation of air quality standards. This is especially true of the environment within textile mills, where the presence of cotton dust and fibers allegedly constitutes an occupational health hazard.

It has been previously recognized that filtering efficiency is increased as a buildup of filtered material (referred to as a "mat") occurs on the upstream side of a screen-type filter. This increase in efficiency is a result of the air being subjected to filtration through a finer filter medium and over a much greater linear distance. Throughout this distance, the mat projects innumerable obstacles into the air stream which deflect and trap entrained particulate matter. Prior art patents have sought to take advantage of this phenomenon.

Representative is the Neitzel U.S. Pat. No. 3,525,198. Neitzel discloses the insertion of a primary fly lint separator into a pneumatic duct which connects a carding room in a textile mill with conventional lint filtering means. The lint separator comprises a rotatable screen drum through which air is passed, with the filtered lint collecting on the upstream surface of the drum. The Neitzel patent states that the continuous rotation of screen drums has not proven practical because a lap having sufficient thickness for efficient doffing cannot build upon the drum surface, notwithstanding a very slow rate of rotation. Neitzel therefore provides a rotatable screen drum which is intermittently rotated through a 180° arc after a substantial mat of fibers has collected on the outside of the screen while stationary. While the Neitzel patent does not explicitly recognize the enhanced filtering efficiency which results from the buildup of lint on the exposed surface of the drum, it is apparent from the disclosure that such an improvement takes place until the drum is rotated, whereupon an immediate decrease in filtering efficiency results as a result of the passage of air through only the screen drum itself. Moreover, the Neitzel patent recognizes that an indefinite accumulation of fibers on the surface of a screen drum results in a gradual decrease of air velocity as the filter becomes clogged.

The Broadbent U.S. Pat. No. 3,628,313 explicitly recognizes the enhanced filtering effect achieved when fibers are collected from an air stream and then used to augment the filtering process. However, the Broadbent patent also recognizes, as is recognized in Neitzel, that there is a increase in air pressure incident to the buildup of a thick mat of fibers on the drum. Therefore, means for sensing this increase in air pressure is provided which momentarily rotates the drum to remove the mat from a predetermined portion of the drum, and exposes the previously matted portion of the filter to the flow of air in order to increase the rate of air flow through the filter. As in Neitzel, there is a degradation of filtering efficiency when the previously matted portion of the filter is exposed to the stream of air. The Broadbent apparatus attempts to diminish this effect by passing the air around a substantial portion of the periphery of the drum at an oblique angle prior to the air reaching the exposed portion of the filter. While it is stated that this procedure avoids the necessity of filtering the air through a secondary filtering means, nevertheless the two broadly recognized problems in the prior art, i.e., the gradual decrease in air velocity as the mat builds up on the filter drum, and the uneven quality of the filtered air resulting from the periodic movement of the drum to expose the uncovered drum to the stream of air, remain largely unsolved.

In apparent recognition of these problems, the Ferri et al U.S. Pat. No. 4,090,857, provides a stationary cylindrical filter box having an air inlet extending in a tangent with respect to the filter in order to induce the air entering the filter to spin. According to Ferri, this spinning motion simultaneously forces air through the filtering medium and constantly moves the trapped fibers along the filter surface to a settling chamber, thereby resulting in a constant pressure drop through the filter. Thus, Ferri avoids the problems inherent in the Neitzel and Broadbent patents by preventing the coating of the filter with trapped fibers. While achieving the goal of maintaining a constant pressure within the system, the advantages inherent in using a thick mat of fibers to enhance the filtration process are completely lost.

SUMMARY OF THE INVENTION

Accordingly, it is the object of this invention to provide an apparatus for separating entrained particulate matter from a conveying fluid which produces a consistently high level of filtration without the necessity of a subsequent filtering operation.

It is another object of the present invention to provide a method and apparatus for separating entrained particulate matter from a conveying fluid which produces filtered fluid containing as little as 1/100th of the particulate matter of fluid from a conventional screen filter.

It is another object of the present method and apparatus to provide relatively constant air quality during and after cleaning of the filter surface.

These and other objects and advantages of the present invention are achieved in the preferred embodiment described below by providing a method and apparatus for separating entrained particulate matter from a conveying fluid wherein particulate matter is collected in an overlying porous layer on an upstream side of a rotatable, fluid-permeable filter in a first chamber, and wherein the porous layer of particulate matter is rotatably conveyed into a second chamber and used as an additional filtering medium of enhanced filtering capacity to filter particulate matter not removed in the first chamber.

The apparatus comprises an enclosed housing having a fluid inlet and a fluid outlet. Filtering means is positioned within the enclosed housing and comprises a rotatably mounted, fluid-permeable endless band having a filter surface thereon for removing entrained particulate matter from a fluid as the fluid is passed through the filter surface from its upstream side to its downstream side. Fluid pumping means operatively communicate with the enclosed housing for inducing a flow of fluid into the enclosed housing through the inlet and out of the enclosed housing through the outlet.

Chamber means are disposed within the enclosed housing and sealingly cooperate with the enclosed housing and with the endless band along substantially its entire width and define, respectively, a first chamber fluidly communicating with the fluid inlet and a first predetermined portion of the endless band on its upstream and downstream sides. A second fluid chamber fluidly communicates with the fluid outlet and a second predetermined portion of the endless band on its upstream and downstream sides. The first and second chambers are fluidly interconnected for fluid flow from the first chamber to the second chamber.

Drive means are provided for rotating the endless band at a predetermined rate, respectively, through the first chamber for collecting on its surface an overlying porous layer of particulate matter to be used as an additional filter medium of enhanced filtering capacity. The drive means then rotate the endless band through the second chamber for filtering the fluid through the filter surface and the overlying porous layer of particulate matter.

Doffing means are also provided for cleaning the filter surface by removing the porous layer of particulate matter therefrom subsequent to the passage of the filter surface through the second chamber.

Preferably, the endless band is comprised of a cylindrical drum formed of expanded metal having a filter surface comprising an overlying screen fabric.

BRIEF DESCRIPTION OF THE DRAWINGS

Some of the objects of the invention having been set forth above, other objects and advantages will appear as the description of the invention proceeds, when taken in conjunction with the following drawings, in which:

FIG. 1 is a perspective view of the apparatus according to this invention;

FIG. 2 is an elevational view of one end of the invention showing the fluid inlet;

FIG. 3 is an elevational view of one side of the invention, with parts broken away;

FIG. 4 is a top plan view of the invention;

DESCRIPTION OF THE PREFERRED EMBODIMENT

Referring now specifically to the drawings, a preferred embodiment of the filtering apparatus according to the present invention is shown in FIG. 1. A housing 10 is shown which encloses the working elements of the apparatus. The housing 10 is comprised of a rectangular waste receptacle 11, the interior of which collects the filtered dust and fibers removed from the air by the filtering apparatus. A door 12 is provided for access into the interior of the waste receptacle 11 so that the accumulated mat of dust and fibers can be periodically removed.

Figure 5:
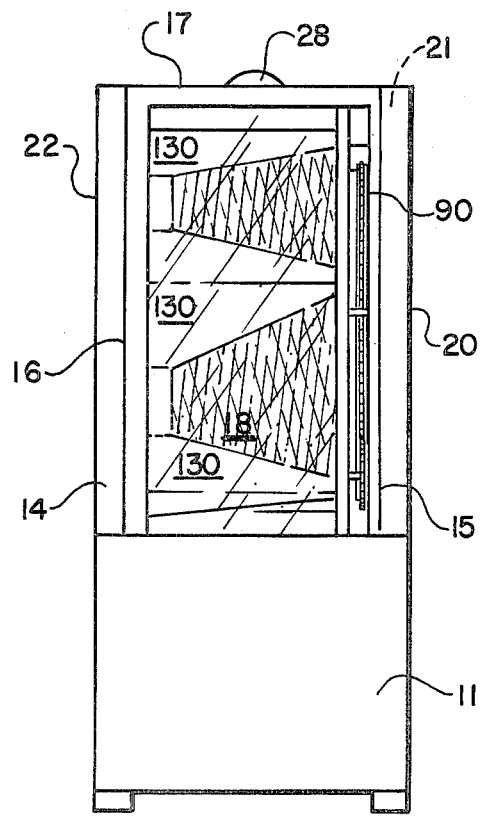
FIG. 5 is an elevational view of the end of the apparatus opposite the fluid inlet.

The upper portion of the housing 10 is comprised of four side walls 13, 14, 15 and 16 which form a rectangular enclosure. As is shown in FIG. 5, wall 14 is provided with a plexiglas observation window 18 in order to allow visual access into the interior of housing 10. A top 17, as is best shown in FIGS. 1 and 4, encloses the top of the housing. A cover 20 is detachably secured in spaced-apart relation to side wall 15 and defines therebetween an upwardly directed air outlet 21 for exhausting filtered air from the filtering apparatus. A cover 22 is detachably secured in spaced-apart relation to side wall 16 and defines an air passageway 23 therebetween for permitting air to flow from the first filtering chamber to the second filtering chamber as is described below. As is shown in FIG. 4, the cover 22 completely encloses side wall 16 and the air passageway 23.

Positioned on wall 13 is an air inlet 25 which communicates with the interior of housing 10 through a suitably sized air inlet port 13a. A plexiglas observation window 26 is fitted in one wall of air inlet 25, in order to provide visual access into the interior of housing 10. As is best shown in FIGS. 1 and 2, the substantially trapezoidal shape of the air inlet 25, with its downwardly diverging side walls 25a and 25b, cooperate with the air inlet port 13a in order to disperse the air evenly across the axial extent of the filtering surface within the housing 10. Dust and fiber laden air is introduced into the air inlet 25 through a supply conduit 28 which fluidly communicates with the air inlet 25 through the top surface thereof, as is shown in FIGS. 1 and 2.

Figure 7:
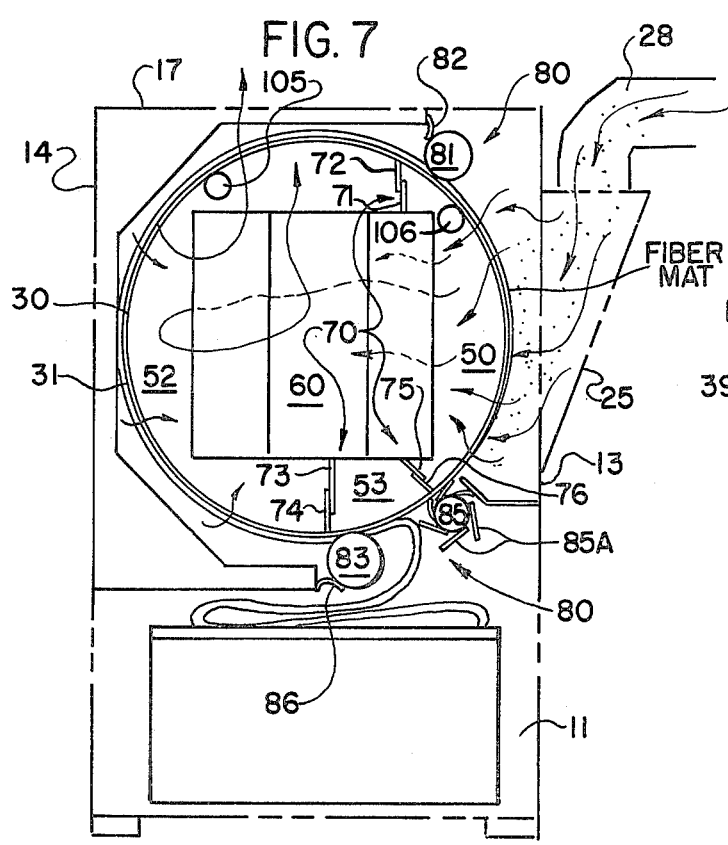
FIG. 7 is a vertical cross-sectional view of the invention as shown in FIG. 3 showing the flow of fluid through the first and second fluid chambers, with parts removed for clarity.
Figure 11:
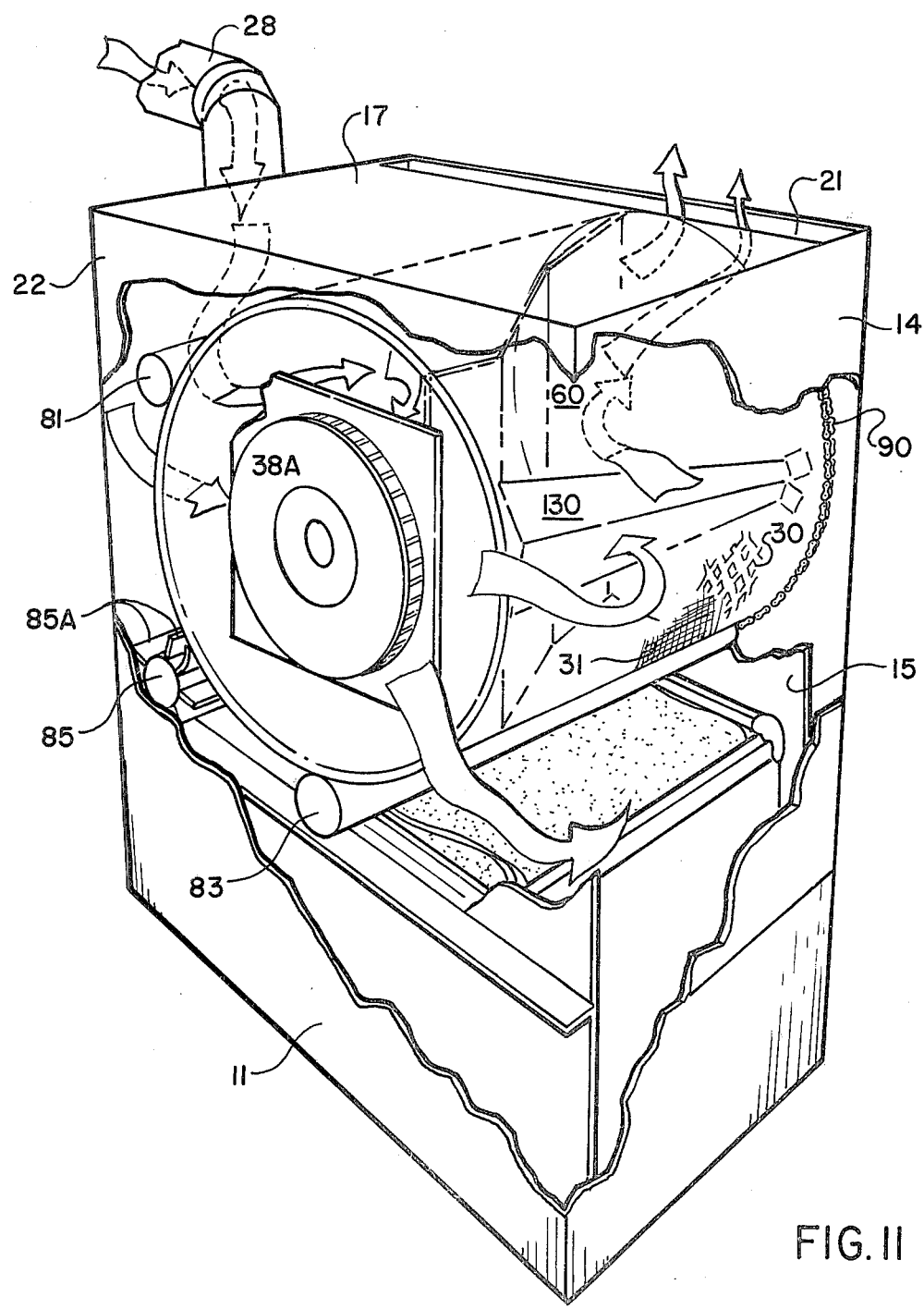
FIG. 11 is an enlarged perspective view of the apparatus according to this invention with parts broken away showing the flow of fluid through the apparatus.

As is shown in FIG. 7, filtering means are positioned within the housing 10 and comprise a rotatably mounted cylindrical drum 30 preferably constructed of a fluid permeable, expanded metal. A filter surface 31 shown in FIG. 11, is positioned on the outer surface of the drum 30 across its entire axial length, and serves as a filter medium for removing entrained dust and fibers from the air as the air is passed through the filter surface 31 and the underlying drum 30 from its upstream side to its downstream side. While the construction of the filter surface 31 can vary widely in accordance with the material to be filtered, a stainless steel screen fabric, having approximately 3600 openings per square inch and formed of wire having a diameter of approximately 7/1,000th of an inch has been found suitable for filtering dust and textile fibers from air.

Figure 8:
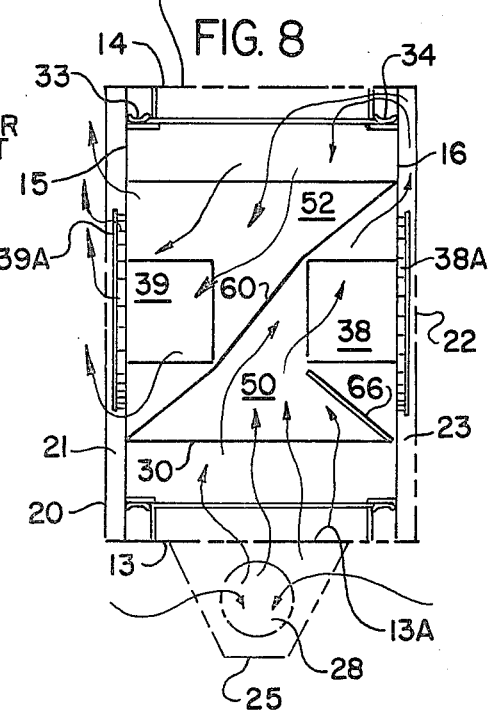
FIG. 8 is a horizontal cross section of the invention as shown in FIG. 4 and illustrating the flow of fluid through the invention.

The opposing peripheral end edges of the drum 30 are sealed by circular rubber seals 33 and 34, respectively, as is best shown in FIG. 8. The rubber seals 33 and 34 are secured to and extend axially outwardly from the opposing end edges of the drum 30 around its circumference and sealingly engage side walls 15 and 16, respectively, of the housing 10. The seals 33 and 34 prevent air leakage from around the opposing axial ends of the drum 30.

Fluid pumping means are provided for inducing a flow of air into the housing 10 through the air inlet 25 and out of the housing 10 through the air outlet 21. The fluid pumping means comprise a pair of centrifugal blowers 38 and 39. As is best shown in FIG. 8, centrifugal blower 38 is secured to the side wall 16 of the housing 10 through a suitably sized aperture. The entire centrifugal blower 38 with the exception of a radial impeller 38a is positioned within the drum 30. The radial impeller 38a is positioned partially within the air passageway 23 defined by the space between inner wall 16 and cover 22.

The centrifugal blower 39 is secured to side wall 15 of the housing 10 for fluid communication through a suitably sized aperture. As is also shown in FIG. 8, the radial impeller 39a of blower 39 is positioned substantially within the air outlet 21 defined by wall 15 and cover 20.

The centrifugal blowers 38 and 39 are each electrically connected to a blower control box 41. Alternatively, blowers 38 and 39 may be electrically wired to the machines from which the unfiltered air is taken, so that the filtering apparatus is started and stopped automatically with the source of the air.

Blowers 38 and 39 operate at an output rate of approximately 1,500 cubic feet per minute, although the range can be varied from approximately 700 cubic feet per minute to approximately 2,000 cubic feet per minute depending on the input source of the air to be filtered.

Chamber means are disposed within the housing 10 and sealingly cooperate therewith and with the drum 30 along substantially its entire width and define, respectively, a first chamber 50, a second chamber 52, and a doffing chamber 53, as is shown in FIG. 7.

Figure 9:
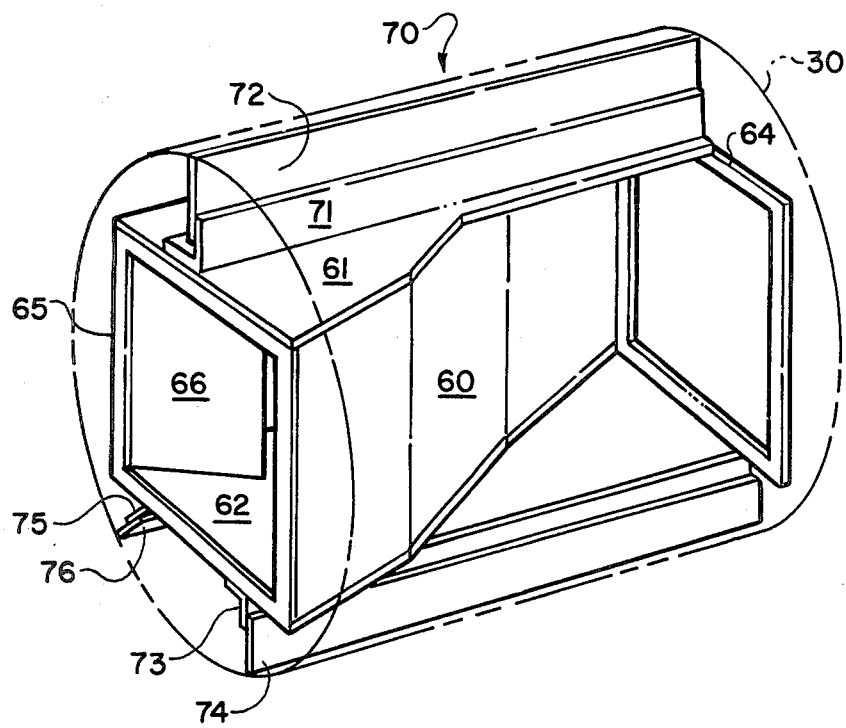
FIG. 9 is a perspective view of the chamber means positioned within the cylindrical drum and defining on opposite sides thereof the first and second chambers.

The chamber means comprise an imperforate chamber baffle 60 which is diagonally positioned within the interior of the cylindrical drum 30. As is shown in FIG. 9, the chamber baffle 60 has an upper baffle plate 61 secured to the top edge thereof, and a lower baffle plate 62 secured to the lower edge thereof. Chamber baffle 60 and upper and lower baffle plates 61 and 62, respectively, are maintained in the same relative position within the drum 30 by means of a metal support frame 64 secured to one end of chamber baffle 60, and a metal support frame 65 secured to the other, opposing end of chamber baffle 60. Support frame 64 is attached to the wall 15 of the housing 10, with the centrifugal blower 39 being positioned therewithin. Support frame 65 is attached to wall 16 of the housing 10 with centrifugal blower 38 positioned therewithin.

In order to create a more symmetrical flow of air through the first chamber 50, a baffle 66 is fixedly secured to the outwardly extending free side of support frame 65, as is shown in FIG. 9. As is shown in FIG. 8, the baffle 66 projects outwardly into the air flow between the drum 30 and the centrifugal blower 38 and deflects the flow of air more toward the downstream side of centrifugal blower 38.

As is best shown in FIG. 9, inner sealing means 70 cooperatively engage chamber baffle 60 and the inner surface of drum 30. Referring to FIG. 7, inner sealing means 70 comprises an elongate angle iron bracket 71 fixedly secured in longitudinally extending position on the top surface of the upper baffle plate 61. A rubber sealing strip 72 is releasably attached in upright position on bracket 71 and projects upwardly and outwardly into sealing contact with the inner surface of drum 30. As is shown in FIG. 9, rubber sealing strip 72 extends substantially from one side of drum 30 to the other, thus providing sealing contact with drum 30 across its entire axial length.

Fixedly secured to the bottom surface of lower baffle plate 62 in longitudinally extending position is an elongate angle iron bracket 73. Releasably attached to bracket 73 is a rubber sealing strip 74, which projects downwardly and outwardly from bracket 73 and sealingly engages the inner surface of the cylindrical drum 30 across substantially its entire axial length.

Also fixedly secured on the bottom surface of lower baffle plate 62 in laterally spaced-apart relation to bracket 73 is a longitudinally extending, elongate angle iron bracket 75. Releasably attached to bracket 75 is a longitudinally extending, rubber sealing strip 76. The downwardly and outwardly projecting edge of rubber sealing strip 76 also sealingly engages the inner surface of drum 30 across substantially its entire axial length.

Outer sealing means 80 are provided and cooperatively engage the inner walls of housing 10 and the outer surface of drum 30. The outer sealing means 80 comprise a polished steel roller 81 rotatably mounted within housing 10 between walls 15 and 16 in axial alignment with drum 30. As is shown in FIG. 7, roller 81 engages the outer surface of drum 30 nearly opposite sealing strip 72. Roller 81 is mounted on a lever arm 81a (shown schematically in FIG. 10) and rests under its own weight on the outer surface of drum 30. As is also shown in FIG. 7, there is a slight radial offset between the sealing strip 72 and the roller 81, the purpose for which is explained below.

A rubber seal 82 sealingly engages the roller 81 along the longitudinal extent thereof and prevents the flow of air between the first chamber 50 and the second chamber 52 across the surface of roller 81 remote from drum 30.

A polished steel roller 83 is rotatably mounted within housing 10 between walls 15 and 16 in axial alignment with drum 30 and sealingly engages the outer surface of cylindrical drum 30 opposite sealing strip 74. Roller 83 is radially offset somewhat from sealing strip 74, as is the case with roller 81 and sealing strip 72, as is explained below, and is urged into engagement with drum 30 by a string-loaded lever arm 83a (shown schematically in FIG. 10).

Rotatably mounted within housing 10 and extending across the axial extent of drum 30 is a doffing roller 85. Secured to the outer surface of doffing roller 85 and extending tangentially outward is a plurality of rubber flaps 85a which, as the doffing roller 85 is rotated against drum 30, scrapes away the fiber mat, the deposits it into the waste receptacle 11. As is shown in FIG. 7, sealing strip 76 engages the inner peripheral surface of drum 30 opposite the doffing roller 85. Due to the tangent at which the rubber flaps 85a are positioned on the surface of the doffing roller 85, at least one such rubber flap 85a is always in surface contact with drum 30 and forms a seal through the drum 30 with sealing strip 76.

As is also shown in FIG. 7, a rubber seal 86 extending longitudinally across the axial length of drum 30 engages roller 83 and prevents the flow of air from the second chamber 52 into the waste receptacle 11.

As is now apparent from the foregoing description, roller 81 and sealing strip 72; and doffing roller 85 and sealing strip 76, together with the lower baffle plate 62, define the first chamber 50. The sealing strip 74 and roller 83, together with sealing strip 72 and roller 81 define the second chamber 52. The space defined between sealing strip 74 and roller 83; and the sealing strip 76 and the doffing roller 85 comprises the doffing chamber 53.

The first chamber 50 encompasses an arc of approximately 115° of drum 30. The second chamber 52 encompasses an arc of approximately 230° of drum 30, and the doffing chamber encompasses an arc of approximately 15° of drum 30.

Referring again to FIGS. 7 and 8, the first chamber 50 fluidly communicates with fluid inlet 25. The first chamber 50 and second chamber 52 are fluidly interconnected through wall 16 of housing 10 by means of centrifugal blower 38, which exhausts air from the first chamber into air passageway 23. The second chamber 52 fluidly communicates with fluid outlet 21 defined by wall 15 and cover 20 by means of centrifugal blower 39, which expels filtered air from the second chamber 52 into the air outlet 21.

As is apparent from FIGS. 7 and 8, drum 30 does not rotate by means of a fixed, central shaft. Rather, drum 30 is driven by drive means which engage its outer peripheral surface. In this manner, drum 30 can be rotated with good sealing contact between the various sealing members described above, notwithstanding any slight irregularity which may cause drum 30 to rotate eccentrically, and can likewise rotate properly notwithstanding any unevenness in the fiber mat overlying filter surface 31 on drum 30.

The driving means comprise an endless driven chain 90 fixedly secured around the entire periphery of the drum 30 closely adjacent one end edge. As is shown schematically in FIG. 10, a drive gear 91 having radially extending teeth on its outer surface is rotatably mounted in housing 10 and matingly engages the driven chain 90.

Drum 30 is rotated by means of an electric motor 92 having a sprocket gear 93 which matingly engages an endless drive chain 94.

Drive chain 94 passes around the sprocket gear 93 mounted on the motor 92, and thence over a drive gear 95 mounted concentrically on doffing roller 85. The drive chain 94 then passes around an idler gear 96 rotatably mounted on the opposing end of lever arm 83a which supports roller 83. The endless chain 94 then passes upwardly and matingly engages a sprocket gear 97 mounted concentrically on drive gear 91. Endless chain 94 then passes over idler gear 98 and idler gear 99 rotatably mounted on the opposing end of lever arm 81a which supports roller 81.

Figure 10:
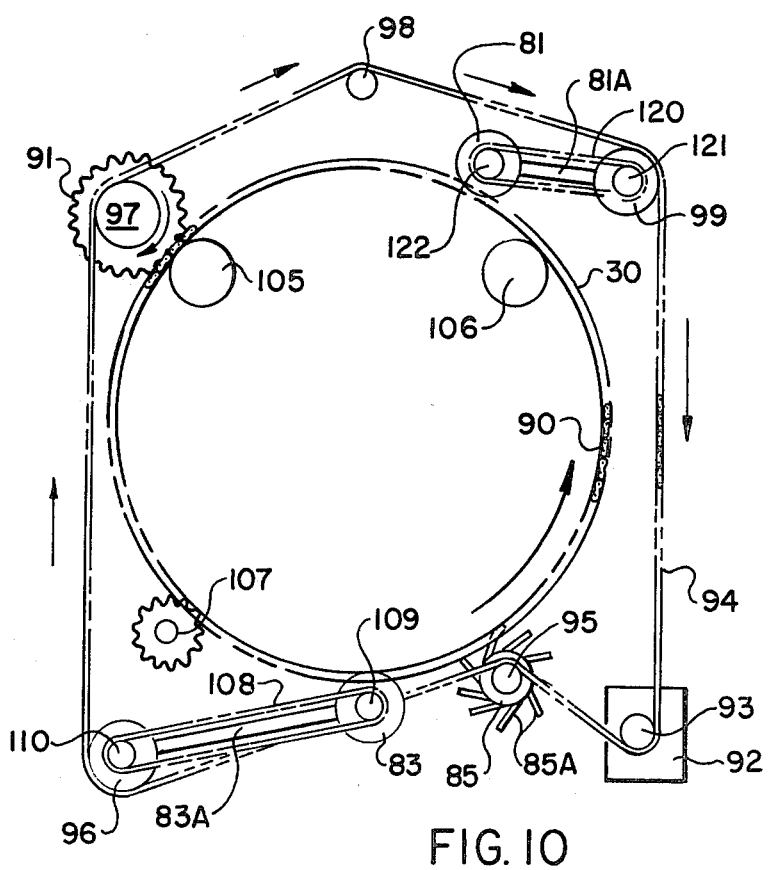
FIG. 10 is a schematic, vertical cross-sectional view of the cylindrical drum and the drive means for rotating the drum.

A pair of supporting rollers 105 and 106 are rotatably mounted within the interior of drum 30, as is shown in FIG. 10, and assists in supporting the drum 30 in its proper position for rotation. A supporting gear 107, having radially projecting teeth thereon is rotatably mounted in the housing 10 and matingly engages driven chain 90 intermediate the idler gear 96 and the drive gear 91. The support gear 107 provides support to the outer surface of the drum 30 as it is rotated by the downward, rotating motion of drive gear 91.

Again referring to FIG. 10, an endless chain 108 rotationally interconnects roller 83 with idler gear 96 by means of concentrically mounted sprocket gears 109 and 110. In this manner, the roller 83 is positively driven and is not rotated by surface contact with drum 30. This positive drive aides in preventing damage to the fiber mat on the filter surface 31.

Likewise, an endless chain 120 rotatably interconnects idler gear 99 with the roller 81 by means of concentrically mounted sprocket gears 121 and 122, respectively. In like manner, roller 81 is positively driven by the endless chain 120, and is not rotated by surface contact with the cylindrical drum 30.

Still referring to FIG. 10, it is shown that the drive gear 91 is rotated clockwise by the drive chain 94 and by its mating engagement with driven chain 90 rotates endless drum 30 in a counterclockwise position, as viewed. Doffing roller 85 is likewise rotated in a counterclockwise manner and the forwardly projecting doffing strips 85a move toward the advancing fiber mat and scrape it from filter surface 31 of drum 30.

In operation, and according to the method of this invention, the filtering apparatus is attached by means of supply conduit 28 to a source of raw, particulate-laden air. As described above, the preferred embodiment of the invention operates at a filtration rate of approximately 1,500 cubic feet of air per minute and is therefore suitable for attachment to either one or two draw frames such as is conventionally used in the textile industry.

When beginning use of the filtering apparatus, the entire filter surface 31 will be clean. Therefore, a thick mat of filtered dust and fibers must be allowed to accumulate on the filter surface 31.

While the mat thickness necessary to achieve optimum filtering efficiency will vary depending on the size, density and composition of the material being filtered, it has been found that in filtering cotton dust and loose fibers from air an accumulation of approximately 1½ inch in the first chamber 50 is satisfactory. When the desired level of accumulation has been attained in the first chamber 50, the drum 30 is rotated, allowing the overlying fiber mat to pass under the roller 81 and into the second chamber 52. Since the surface area of the drum 30 within the second chamber 52 at any given time is approximately twice the surface area within the first chamber 50, at least two contiguous fiber mats of appropriate thickness must be accumulated within the first chamber 50, and then rotated into the second chamber 52. It should be emphasized that so long as any of the filter surface 31 within the second chamber 52 is clean and not covered by a thick, overlying fiber mat, the efficiency potential of this filtering apparatus cannot be achieved.

Only when a fiber mat of appropriate thickness covers the entire surface area of the drum 30 within the second chamber 52 is optimum filtering efficiency achieved.

As is shown schematically in FIG. 8, the unfiltered air is directed into and enters the first chamber 50 through the air inlet 25 and passes through the filter surface 31 and the underlying drum 30 from the upstream to downstream side. The first filtering operation occurs as the air passes through the filter surface 31. After having been once filtered in the first chamber 50, the air is exhausted from the first chamber 50 by blower 38 into the air passageway 23.

Figure 6:
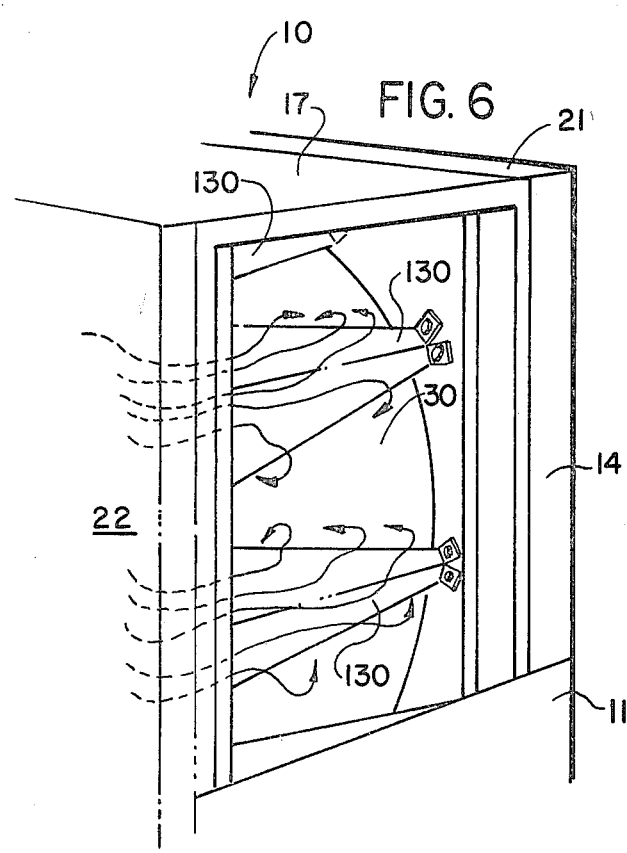
FIG. 6 is a perspective view of the end of the apparatus as shown in FIG. 5 and showing the fluid flow across and around the fluid baffles for evenly dispersing the fluid across the filter surface in the second chamber.

As is shown in FIGS. 6 and 8, the once-filtered air is introduced into the second chamber 52 adjacent one axial end of the drum 30. Since this air is being subjected to the vacuum created by blower 39, it is apparent that this air will tend to move at sharp right angles into the second chamber 52 and through the filter surface 31 positioned therein. This phenomenon would tend to cause an uneven buildup of fibers on the surface of the drum 30 adjacent the air passageway 23, where the air enters the second chamber 52.

In order to evenly disperse this air, a plurality of baffle members 130 are positioned in the second chamber 52 intermediate the flow of air into the second chamber 52 and the drum 30. The baffle members 130 extend substantially entirely across the axial length of the drum 30 and have an elongate trapezoidal, quadrilateral shape with opposing, converging sides extending axially along the path of fluid flow to the filter surface 31. Each of the baffle members 130 have an inwardly facing concave surface and an outwardly facing convex surface in order to correspond more closely to the curvature of the drum 30. As is shown in FIG. 6, the baffle members 130 defeat the effort of the air to flow directly to drum 30, instead forcing the air axially across the second chamber 52 prior to deflecting inwardly towards drum 30.

The first filtering operation which takes place in the first chamber 50 is intended primarily to remove the larger fibers and dust particles from the air. However, with a fiber mat approximately 1½ inches thick on the filter surface 31 in the first chamber 50, some of the very small dust and fiber particles will also be removed from the air stream. Due to the removal in the first chamber 50 of most of the larger dust and fiber particles, the fiber mat which accumulates therein will have a substantial tendency to become thicker as the filtering process continues. As the fiber mat becomes thicker and more dense, less air is moved through the fiber mat by blower 38, and hence the vacuum on the downstream side of the drum 30 increases.

In order to maintain the vacuum pressure within the filtering apparatus within desired limits during continuous operation of the filtering apparatus, means are preferably included to rotate the drum 30 at predetermined intervals. The rotation of the drum 30 passes a portion of the fiber mat from the second chamber 52 into the doffing chamber 53. The fiber mat is then removed from the filter surface 31 by the doffing roll 85. The doffing roll 85 removes the fiber mat from the filter surface 31 in a continuous blanket which falls into the waste receptacle 11. As the filter surface 31 is cleaned by the doffing roll 85, it rotates back into the first chamber 50. By exposing clean filter surface 31 to the first chamber 50, the air flowing therethrough will tend to pass through this section of cleaned filter surface 31 due to decreased flow resistance, maintaining the vacuum pressure within the filtering apparatus within desired limits.

In environments where the unfiltered air contains a relatively constant percentage of particulate matter over an extended period of time, the desired rate of rotation of the drum 30 can be determined empirically, and a simple timing mechanism can be attached to the drive motor 92. Thus, if an accumulation of a 1½ inch fiber mat on the filter surface 31 in first chamber 50 consistently requires 15 minutes, a timer switch may be used to activate the drive motor 92 in order to doff the fiber mat from a section of the filter surface 31 and pass it into the first chamber 50. Simultaneously, a portion of the fiber mat on the filter surface 31 in the first chamber 50 is rotated into the second chamber 52.

Preferably, the drive means is geared to rotate the drum 30 at a surface speed of approximately 1 inch per second. A 2-3 inch section of clean filter surface 31 is adequate to maintain the vacuum pressure within desired limits.

However, in the disclosure according to this preferred embodiment, means responsive to a predetermined decrease in air pressure within the downstream side of the first chamber 50 incident to a buildup of dust and fibers on the filter surface 31 therein are provided and comprise a first pneumatic tube 140 positioned in fluid communication with the upstream side of the first chamber 50, as is shown in FIG. 3. A second pneumatic tube 141 fluidly communicates with the downstream side of the first chamber 50, as is also shown in FIG. 3. As the mat of dust and fibers accumulates on the filter surface 31, the increase in vacuum on the downstream side of drum 30 is sensed by the pneumatic tube 141. The differential between the air pressure on the upstream side sensed by the pneumatic tube 140, and the air pressure on the downstream side, sensed by pneumatic tube 141, is conveyed to a fluidly communicating, pneumatically operated electrical switch 142 positioned on wall 13 of the enclosed housing 10. Electric switch 142 is wired to the drive motor 92 and upon activation, energizes the drive motor 92 which thereby rotates the drum 30. When 2-3 inches of clean filter surface 31 has been passed into the first chamber 50, thereby increasing the flow of air therethrough, this decrease is sensed by the pneumatic sensing tubes 140, 141, and the electrical switch 142 de-energizes the drive motor 92, stopping the rotation of drum 30.

It is important to note that clean filter surface 31 is never exposed to air flow within the second chamber 52. In this manner, all of the air flowing through the filtering apparatus is filtered twice, and none of the air escapes from the filtering apparatus through air outlet 21 without first having passed through the fiber mat on the filter surface 31 within the second chamber 52.

It has been observed that during the rotation of drum 30 some crushing of dust and fibers occurs as the fiber mat is passed under the rolls 81 and 83. For this reason, as is described above, roll 81 is radially offset somewhat from the sealing strip 72, as is shown in FIG. 7. If any crushing of dust or fibers should occur during rotation, and pass through the filter surface 31, the radial offset will prevent its passage into the downstream side of the second chamber 52. Rather, the dust will pass through the filter surface 31 into the downstream side of the first chamber 50, and will be filtered from the air as it is conveyed to the second chamber 52 and through the overlying fiber mat on the filter surface 31 therein.

Likewise, should any crushing of dust and fibers occur as the fiber mat passes between the sealing strip 74 and the roller 83, the radial offset shown in FIG. 7 causes any loose dust or fibers to pass into the upstream side of the drum 30 in the second chamber 52 and be refiltered again through the overlying fiber mat.

Experimentation has been conducted to ascertain the efficiency of the air filtration carried out in accordance with the apparatus and method of the present invention. Using a TSI Piezobalance particle monitoring instrument, exhaust air readings in the air outlet 21 have been obtained in the range of 0.1-0.35 milligrams per cubic meter, with most readings falling within the 0.1 milligram per cubic meter range. These results were obtained with a 1½ inch mat of fibers while not rotating the drum 30.

The effect of the thickness of the dust mat on the drum 30 is illustrated by an exhaust air reading of 5 milligrams per cubic meter with a mat ⅛ of an inch thick on the drum 30, while results of 0.1 and 0.3 milligrams per cubic meter in successive tests have been achieved with a mat 1½ inch thick—the preferred thickness for the filtration of dust and fibers.

The design of the filtering apparatus lends itself easily to changes in size necessary to accomplish different tasks. For example, the filtering apparatus can be produced in a greatly reduced size for use on individual machines of various types, and to filter different types of fluids. Likewise, a greatly enlarged filtering apparatus operating on exactly the same principles can be constructed and used with a central air system.

A filtering method and apparatus has been described above which filters air with a high degree of efficiency and at relatively constant rates. Various details of the invention may be changed without departing from the scope of the invention. Furthermore, the foregoing description of the preferred embodiment is for the purpose of illustration only and not for the purpose of limitation—the invention being defined by the claims.

We claim:

1. An apparatus for separating entrained particulate matter from a conveying fluid wherein particulate matter is collected in an overlying porous layer on an upstream side of a rotatable, fluid-permeable filter in a first chamber, and wherein the porous layer of particulate matter is rotatably conveyed into a second chamber and used as an additional filtering medium of enhanced filtering capacity to filter particulate matter not removed in the first chamber, comprising:
   a. an enclosed housing having a fluid inlet and a fluid outlet therein;
   b. said rotatable filter being positioned within said enclosed housing and comprising a rotatably mounted, fluid permeable, endless band having a filter surface thereon for removing entrained particulate matter from a fluid as the fluid is passed through the filter surface from the upstream side to a downstream side thereof;
   c. fluid pumping means operatively communicating with said enclosed housing for inducing a flow of fluid into said enclosed housing through the inlet and out of said enclosed housing through the outlet;
   d. chamber means disposed within said enclosed housing and sealingly cooperating with said enclosed housing and with said endless band along substantially the entire width thereof and defining, respectively, said first chamber fluidly communicating with said fluid inlet and a first predetermined portion of said endless band on the upstream and downstream sides thereof, and said second chamber fluidly communicating with said fluid outlet and a second predetermined portion of said endless band on the upstream and downstream sides thereof; said first and second chambers being fluidly interconnected for fluid flow from the first chamber to the second chamber.
   e. drive means for rotating said endless band at a predetermined rate, respectively, through said first chamber for collecting on the filter surface thereof said overlying porous layer of particulate matter to be used as the additional filter medium of enhanced filtering capacity, and through said second chamber for filtering fluid through said filter surface and the overlying porous layer of particulate matter; and
   f. doffing means for cleaning said filter surface by removing said porous layer of particulate matter therefrom subsequent to the passage thereof through said second chamber.

2. An apparatus according to claim 1, wherein said endless band comprises a cylindrical drum formed of expanded metal.

3. An apparatus according to claim 2, wherein the filter surface comprises an overlying screen fabric.

4. An apparatus according to claim 2, wherein said chamber means comprises:
   a. an imperforate chamber baffle positioned in said cylindrical drum and defining on one longitudinal side thereof said first chamber, and on the opposite side thereof said second chamber;
   b. inner sealing means cooperatively engaging said chamber baffle and the inner peripheral surface of said cylindrical drum; and
   c. outer sealing means cooperatively engaging the inner surfaces of said enclosed housing and the outer peripheral surface of said cylindrical drum.

5. An apparatus according to claim 4, wherein said chamber baffle is positioned diagonally within said cylindrical drum.

6. An apparatus according to claim 2, wherein said drive means comprises a drive chain fixedly secured to the periphery of said cylindrical drum, and a drive motor driving a drive gear matingly engaging with said drive chain for rotating said drum.

7. An apparatus according to claim 1, wherein said fluid pumping means comprises a first pump fluidly communicating with said first chamber for inducing a flow of fluid into said first chamber through the filter surface positioned therein and out of said first chamber on the downstream side of the filter surface; and a second fluid pump fluidly communicating with said second chamber for inducing a flow of fluid into said second chamber, through the filter surface positioned therein, and out of said second chamber on the downstream side of the filter surface.

8. An apparatus according to claim 1, wherein said doffing means comprises a roller extending across the axial length of said endless band closely adjacent the outer peripheral surface thereof, means for rotating said roller, and means positioned on the surface of said roller for engaging and removing said porous layer of particulate matter from said endless band as said roller and said endless band rotatingly engage.

9. An apparatus according to and including claim 1, a means responsive to a predetermined decrease in fluid pressure within the downstream side of said first chamber incident to buildup of particulate matter on the filter surface therein for actuating said drive means and said doffing means and doffing said filter surface for passage thereof into said first chamber, thereby increasing the fluid pressure at the downstream side of said first chamber and deactuating said doffing means and said drive means.

10. An apparatus for separating entrained particulate matter from a conveying fluid wherein particulate matter is collected in an overlying porous layer on an upstream side of a rotatable, fluid-permeable filter in a first chamber, and wherein the porous layer of particulate matter is rotatably conveyed into a second chamber and used as an additional filtering medium of enhanced filtering capacity to filter particulate matter not removed in the first chamber, comprising:

a. an enclosed housing having a fluid inlet and a fluid outlet therein;

b. said rotatable filter being positioned within said enclosed housing and comprising a rotatably mounted, fluid permeable, cylindrical drum formed of expanded metal and having a filter surface for removing entrained particulate matter from a fluid as the fluid is passed through the filter surface from the upstream side to a downstream side thereof;

c. chamber means disposed within said enclosed housing and sealingly cooperating with said enclosed housing and with said cylindrical drum along substantially the entire width thereof and defining, respectively, said first chamber fluidly communicating with said fluid inlet and a first predetermined portion of said cylindrical drum on the upstream and downstream sides thereof, and said second chamber fluidly communicating with said fluid outlet and a second predetermined portion of said cylindrical drum on the upstream and downstream sides thereof, said first and second chambers being fluidly interconnected for fluid flow from the first chamber to the second chamber; said chamber means comprising an imperforate chamber baffle positioned in said cylindrical drum and extending substantially the entire length thereof and defining on one longitudinal side thereof said first chamber, and on the opposite side thereof said second chamber; inner sealing means cooperatively engaging said chamber baffle and inner peripheral surface of said cylindrical drum; and outer sealing means cooperatively engaging the inner surfaces of said enclosed housing and the outer peripheral surface of said cylindrical drum opposite said inner sealing means;

d. fluid pumping means operatively communicating with said enclosed housing for inducing a flow of fluid into said enclosed housing through the inlet and out of said enclosed housing through the outlet and comprising a first pump fluidly communicating with said first chamber for inducing a flow of fluid into said first chamber through the filter surfacd positioned therein and out of said first chamber on the downstream side of said filter surface, and a second fluid pump fluidly communicating with said second chamber for inducing a flow of fluid into said second chamber through the filter surface positioned therein and out of said second chamber on the downstream side of said filter surface;

e. drive means for rotating said cylindrical drum at a predetermined rate, respectively, through said first chamber for collecting on the outer filter surface thereof said overlying porous layer of particulate matter to be used as the additional filter medium of enhanced filtering capacity, and through said second chamber for filtering fluid through said outer filter surface and the overlying layer of particulate matter, said drive means comprising a drive chain cooperatively engaging the periphery of said cylindrical drum, and a drive motor having a sprocket gear matingly engaging with said drive chain for rotating said cylindrical drum; and f. doffing means for removing the porous layer of particulate matter from the filter surface subsequent to the passage thereof through said second chamber and prior to the passage thereof into said first chamber.

11. An apparatus according to claim 10, wherein said doffing means comprises a roller extending across the axial length of said cylindrical drum closely adjacent the outer peripheral surface thereof; means for rotating said roller, and means positioned on the surface of said roller for engaging and removing said porous layer of particulate matter from said cylindrical drum as said roller rotates.

12. An apparatus according to claim 11, wherein the means positioned on the surface of said roller for engaging in removing said porous layer of particulate matter from said cylindrical drum comprises at least one axially extending, relatively thin flexible member.

13. An apparatus according to claim 10, wherein said first fluid pump is positioned in one axial end of said cylindrical drum, and said second fluid pump is positioned in the other axial end of said cylindrical drum.

14. An apparatus according to claim 13, wherein fluid is introduced into said second chamber adjacent one axial end of said cylindrical drum.

15. An apparatus according to claim 14, including means for evenly dispersing said fluid across the axial extent of the filter surface in said second chamber.

16. An apparatus according to claim 15, wherein said means for evenly dispersing said fluid across the axial extent of the filter surface in said second chamber comprises at least one baffle member secured to said enclosed housing intermediate the flow of fluid into said second chamber and the filter surface therein and extending substantially entirely across the axial length of said cylindrical drum, said baffle member having an elongate trapezoidal, quadrilateral shape with opposing, converging sides extending axially along the path of fluid flow to said filter surface.

17. An apparatus according to claim 10, including means for evenly dispersing fluid across the axial extent of the filter surface in said first chamber.

18. An apparatus according to claim 10, wherein the arc of said cylindrical drum within said second chamber is greater than the arc of the cylindrical drum within said first chamber.

19. An apparatus according to claim 10 and including means responsive to a predetermined decrease in fluid pressure within the downstream side of said first chamber incident to buildup of particulate matter on said filter surface thereof for actuating said drive means and said doffing means and doffing said filter surface for passage thereof into said first chamber, thereby increasing the fluid pressure at the downstream side of said first chamber and deactuating said doffing means and said drive means.

20. A method of separating entrained particulate matter from a conveying fluid, comprising the steps of:

a. directing the particulate-containing fluid into a first chamber and through a rotatable, fluid permeable, endless band having a filter surface thereon and collecting particulate matter from said fluid in an overlying porous layer on the upstream side of said filter surface to form an additional filter medium of enhanced filtering capacity;

b. rotating said endless band with said overlying porous layer of particulate matter thereon from said first chamber into a second chamber; and c. directing fluid once filtered in said first chamber from said first chamber into said second chamber and through said overlying porous layer of particulate matter from the upstream to the downstream side thereof, thereby removing additional particulate matter from said fluid.

21. A method according to claim 20, including the added step of doffing the porous layer of particulate matter from the filter surface subsequent to the passage thereof through said second chamber.

22. A method according to claim 21, and including the step of maintaining fluid pressure within predetermined limits within said first chamber by rotating said endless band at intervals to pass doffed filter surface into said first chamber to increase fluid pressure at the downstream side of said first chamber.

23. A method according to claim 22, wherein the interval for rotating said endless band is determined by sensing the decrease of fluid pressure on the downstream side of said first chamber incident to the buildup of particulate matter on the filter surface within said first chamber.

24. A method according to claim 20, wherein the fluid is directed into said first chamber and through the filter surface by a fluid pump on the downstream side thereof.

25. A method according to claim 24 wherein the step of directing the fluid comprises pumping the fluid into said second chamber and through said porous layer of particulate matter by a second fluid pump on the downstream side thereof.

26. A method according to claim 20, including the step of dispersing the particulate-containing fluid as it is directed into said first chamber so as to pass said fluid substantially evenly through said filter surface therein.

27. A method according to claim 26, including the step of dispersing the fluid from said first chamber so as to pass said fluid substantially evenly through the overlying porous layer of particulate matter in said second chamber.

28. An apparatus for separating entrained particulate matter from a conveying fluid wherein particulate matter is collected in an overlying porous layer on an upstream side of a fluid-permeable filter in a first chamber, and wherein the porous layer of particulate matter is conveyed into a second chamber and used as a filtering medium, comprising:
   a. an enclosed housing having a fluid inlet and a fluid outlet therein;
   b. said filter being positioned within said enclosed housing and comprising a band having a filter surface thereon for removing entrained particulate matter from a fluid as the fluid is passed through the filter surface from the upstream side to a downstream side thereof;
   c. fluid pumping means operatively communicating with said enclosed housing for inducing a flow of fluid into said enclosed housing through the inlet and out of said enclosed housing through the outlet;
   d. chamber means disposed within said enclosed housing and sealingly cooperating with said enclosed housing and with said band and defining, respectively, said first chamber fluidly communicating with said fluid inlet and a first predetermined portion of said band on the upstream and downstream sides thereof, and said second chamber fluidly communicating with said fluid outlet and a second predetermined portion of said band on the upstream and downstream sides thereof,
   e. drive means for moving said band through said first chamber for collecting on the filter surface thereof said overlying, porous layer of particulate matter to be used as the filtering medium and through said second chamber for filtering fluid through said filter surface and the overlying porous layer of particulate matter.

29. A method of separating entrained particulate matter from a conveying fluid, comprising the steps of:
   a. directing the particulate-containing fluid into a first chamber and through a fluid permeable band having a filter surface thereon and collecting the particulate matter from the fluid in an overlying porous layer on an upstream side of said filter surface to form a filter medium of enhanced filtering capacity;
   b. moving said band with said overlying porous layer of particulate matter thereon from said first chamber into a second chamber; and
   c. directing said fluid into said second chamber and through said overlying porous layer of particulate matter from an upstream to a downstream side thereof.

* * * * *